3,849,383
Patented Nov. 19, 1974

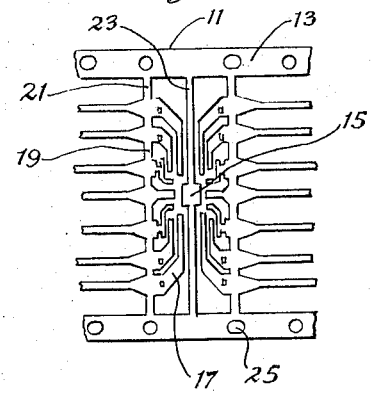
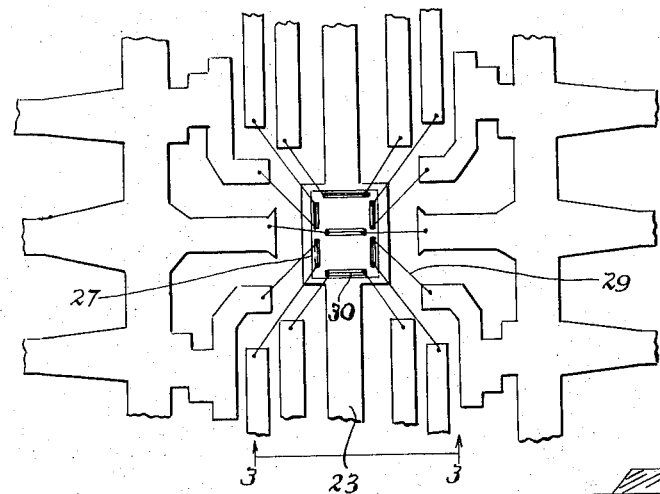
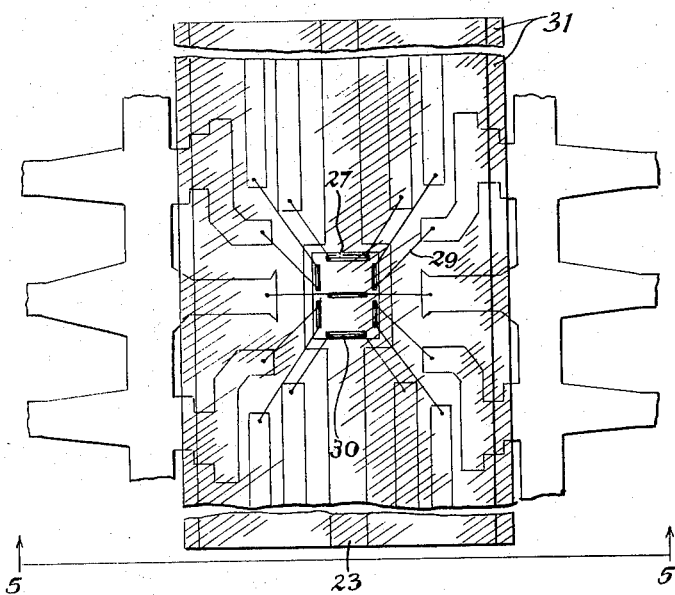
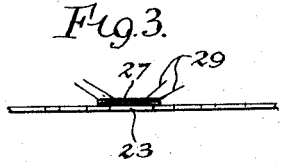
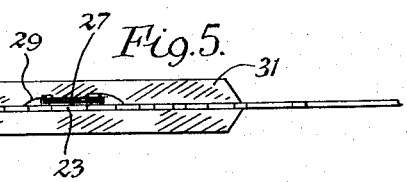
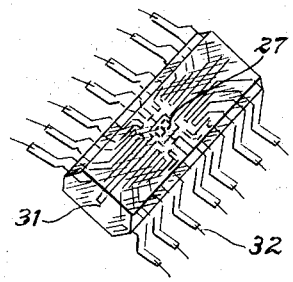

3,849,383
MOLDING COMPOUNDS FROM HEXAHYDROPHTHALIC ANHYDRIDE, TRIGLYCIDYL ISOCYANURATE AND A POLYOL

Charles A. Fetscher and Paul R. Schweyen, Olean, N.Y., assignors to The Dexter Corporation, Windsor Locks, Conn.
Filed Mar. 5, 1973, Ser. No. 338,191
Int. Cl. C08g 17/04
U.S. Cl. 260—75 N                    35 Claims

ABSTRACT OF THE DISCLOSURE

A clear molding compound, suitable for molding about electronic devices which emit or repsond to light, such as light emitting diodes, is made by reacting a lower aliphatic polyol, such as glycerol or trimethylol propane, with hexahydrophthalic anhydride and triglycidyl isocyanurate in such a manner that the acid anhydride reacts with the polyol to produce monoesters of the acid and the carboxylic acid groups so produced react with glycidyl moieties of the triglycidyl isocyanurate. Also disclosed are molding compositions, molded articles made from them and methods of manufacturing such articles.

---

This invention relates to clear epoxy resin molding compounds. More particularly, it relates to such compounds which are curable to polymers of exceptional clarity and stability, so that they may be employed to cover, strengthen and protect electronic devices which emit or respond to light.

BACKGROUND OF THE INVENTION

In the manufacture of computers and other devices which "print" entries or answers in light, transparent resinous protective coverings or encapsulants are employed to hold and protect the light emitting diodes and similar electronic devices employed. Such encapsulants are also used with miniature photoelectric cells and other light-responsive elements. Epoxy resins possess satisfactory heat resistance, physical durability and dimensional stability for these applications but those in use before this invention. unless specially processed, have been found to discolor when heated in the presence of air. To be satisfactory the protective covering polymer should be clear initially and should remain clear, preferably water white, although colored, molded items are also made, and should be unchanged in light transmission for its entire intended useful life.

Resistance to discoloration in use may be predicted by accelerated aging tests at elevated temperatures and such tests and others, including practical use tests, can be employed to evaluate epoxy resins made to be used as coverings or encapsulants for the light emitting or responsive electronic devices or to be otherwise exposed to elevated temperatures. To be satisfactory an epoxy resin should not blush, cloud, discolor or distort when held in boiling water at 15 pounds per square inch gauge for 48 hours and should exhibit no change in color or clarity after 48 hrs. at 130° C. in air at atmospheric pressure.

Liquid epoxy resin systems have been made which are essentially clear and colorless and color stable, if cured very slowly and carefully. Such processes are not economically practicable because efficient mass production methods require rapid cures. Rapid curing is obtainable with molding compounds but before the present invention no epoxy resin-based molding compound that gave so colorless and color stable a molded product had been known. Now, however, such a molding compound has been discovered which is stable before final curing and which, when cured, can produce a water white, clear, colorless, color stable cured resin, suitable for use to encapsulate or cover light emitting or light responsive electronic devices. The products made are curable to polymers which withstand boiling water at 15 lbs./sq. in gauge for 48 hours without blushing, clouding, discoloring or distorting and which do not change in color or clarity after 48 hours in air at 130° C.

DESCRIPTION OF THE INVENTION

In accordance with the present invention there is provided a clear molding compound which is the reaction product of a lower aliphatic polyol of 3 to 6 carbon atoms and 2 to 4 hydroxyls, hexahydrophthalic anhydride and triglycidyl isocyanurate, with the proportions and reaction conditions being such that the acid anhydride reacts with the polyol to produce an ester and a free carboxylic acid group and the carboxylic acid group reacts with a glycidyl moiety of the triglycidyl isocyanurate. Also within the invention are articles molded from said molding compound, including light emitting and light responsive electronic devices covered with and strengthened by such cured resin, and methods for manufacturing the molding compound and the final molded articles.

Various objects, details, constructions, operations, processes and advantages of the invention will be apparent from the following description, taken in conjunction with the accompanying illustrative drawing of a preferred embodiment of a molded light emitting electronic article, in which drawing:

FIG. 1 is a top plan view of a flat metal base onto which a semi-conductor chip, comprising a plurality of light emitting diodes connected selectively to sources of electricity, is mounted, which chip and connections are protected by the molding about them of a clear, light transmitting polymer of the present invention;

FIG. 2 is a partial, enlarged, top plan view of the base of FIG. 1 with the semi-conductor chip mounted thereon and connected to leads;

FIG. 3 is a front elevational view of a part of the base plus chip of FIG. 2;

FIG. 4 is a top plan view of the base plus chip of FIG. 2 with the present clear, light transmitting polymer molded about it;

FIG. 5 is a front elevation of the article of FIG. 4; and

FIG. 6 is a perspective view of the article of FIG. 4, with rigidifying but shortcircuiting connections removed and with leads bent to shape for connection to a computer, calculator or other electronic device.

DETAILED DESCRIPTION OF THE INVENTION

In FIG. 1 base 11, which may be part of a strip containing a plurality of such base sections, includes an outer frame portion 13, a platform 15, on which a semi-conductor chip containing a plurality of diode sections is to be mounted, and connections 17, of which there are fourteen in the illustrated embodiment, by which connections one or more of the seven light emitting diodes may be actuated to selectively light up any number from 1 to 9, or 0. Of course, by utilizing other arrangements of the light emitting diodes, letters, other forms of numbers and other signs may also be indicated. Similarly, instead of light emitting diodes, in other forms of the present invention light responsive electronic means are molded into the protective polymeric material. Bridges 19, between leads 17, and bridges 21, between such end leads and frame 11, hold the leads in place during mounting of the semi-conductor chip and molding of the polymer about it and the leads. Similarly, bridges 23 maintain the platform 15 in desired relationship with the various leads and prevent it and the chip from being moved out of position during the molding operation. Perforations 25 facilitate positioning of the base for joinder of a semi-conductor chip to it, connecting of the chip to the leads and molding of the light transmitting polymer about the semi-conductor chip on the base. In FIGS. 2 and 3 the semi-conductor chip 27 is illustrated on platform 15 and thin gold conductive wires 29 are shown connecting the seven diodes 30 to the various leads. In FIGS. 4 and 5 a protective cover or body 31 of light transmitting polymer of this invention is shown surrounding the semi-conductor chip, wires, leads and platform within the boundaries of the frames of the base. In FIG. 6 bridges 19 and 21 have been removed and bridges 23 have been cut so as to avoid short-circuitings between the various components of the chip. Also, leads 17 have been bent to desired shape for affixing in place in an electronic device. Wires 32 symbolically represent connectors between leads 17 and other parts of the electronic device but leads 17 may be soldered, pressed or clamped in place, too. As will be noted, the clear pastic protects the electronic light emitting device against the elements, e.g., air and maintains the various components thereof in place, supporting and holding them in desired relationship.

The clear molding compound of the present invention is a reaction product of a polyol, an anhydride of a cyclic dibasic acid and an epoxy-containing compound. The polyol should be a lower aliphatic polyol of 3 to 6 carbon atoms and 2 to 4 hydroxyls, preferably of 3 hydroxyls, although in some cases minor proportions of other polyols may be blended in, providing that they do not adversely affect the molding compound properties. The highly preferred polyols employed are glycerol and trimethylol propane (TMP), alone or in mixture, and of these, the TMP is usually slightly better than glycerol. However, other polyols of the group described may be utilized in minor proportions, generally being less than 25%, e.g., 5 to 25%, of the polyol content. Among these are ethylene glycol, diethylene glycol, propylene glycol and dipropylene glycol. A suitable substitute material for these or for part of them is propoxylated pentaerythritol, a tetrol having a molecular weight of about 400, sold under the name PeP–450. This propoxylated pentaerythritol may be used in small quantities, generally being limited to 5 to 25% of the polyol content, preferably on a hydroxyl content basis. In the selection of the "supplementing" polyols it will often be most desirable to employ those which are liquid at room temperature or with heating to comparatively low temperatures. However, comparatively high melting materials, e.g., pentaerythritol, may be employed, preferably as a small proportion of polyol component and in the two-step procedures which will be described subsequently, when it is activated or dissolved so that it will react at a moderate temperature, e.g., 140° C.

The cyclic anhydride used to produce the present excellently clear and colorless cured epoxy resins in the cycloaliphatic anhydride, hexahydrophthalic anhydride (HHPA). Small quantities of other related anhydrides, such as tetrahydrophthalic anhydride and phthalic anhydride, may be present with the hexahydrophthalic anhydride but should not be more than 25% of the total cyclic acid anhydride content, e.g., 5 to 25%, for best results. When greater quantities are employed there is a noticeable loss of brilliant clarity.

The epoxy-containing compound utilized is triglycidyl isocyanurate (TGIC). Such material is sometimes polymerized but for the carrying out of the process of the present invention and the making of the most desirable final product the monomer is best employed. The commercial monomer is generally a mixture of two isomers, one of which melts at about 103° C. and the other of which melts at about 150° C. Either isomer and their mixtures are operable in the present invention but the low melting isomer is more convenient. Monomeric TGIC, when heated strongly, e.g., 3 hours at 150° C., discolors badly. It is therefore surprising that when cured in the present systems it yields a product which does not discolor at all under such conditions, even when such heating is preceded or followed by heating for 48 hours at 130° C.

The various reactants will be essentially pure, over 95% pure, preferably over 99% pure and most preferably 99.9 to 100% pure. Of course, they should be clean and colorless and water content is to be avoided. Mixtures of various mentioned reactants may be employed but usually single starting materials will be used, although, as in the 2-stage reactions wherein HHPA and triol are pre-reacted, the "reactant" made contains many species.

Although the reactions to make the molding compounds and subsequently to cure them may be effected without a catalyst, sometimes, in order to speed the reaction, the presence of a catalyst may be useful. It has been found that a relatively small group of catalytic materials, tin soaps of fatty acids of 8 to 18 carbon atoms, exerts a catalytic effort without impairing the clarity, colorless nature and other desirable properties of the molding compound and the finished cured product.

Other than the polyol, acid anhydride and epoxy-containing reactants, optionally with the tin soap catalyst, the presence of large proportions of other materials in the molding compounds is avoided, so as to assure maintenance of the crarity and other properties of the cured polymer. Minor proportions of adjuvants which have specific desirable effects are acceptable. Thus, mold release agents and colorants may be employed. Among the mold releases higher fatty acids of 12 to 20 carbon atoms, or lower alcohol (1–3 carbon atoms) esters thereof, preferably saturated and most preferably stearic acid or methyl stearate, are utilized because they are very effective in easily releasing the product from the mold. Clear dyes, including fluorescent dyes or optical brighteners are similarly useful. Among preferred dyes are, for example, Perox Blue, preferably in acetone, and Oil Red (DuPont) and among the fluorescent dyes, which are well known in the art for brightening purposes, a specifically useful and preferred example is Tinopal PCR, a product of Ciba-Geigy Corp. However, various other normal and fluorescent dyes which are lipophilic may be utilized. Descriptions of these may be found in dyers' or colorists' handbooks. Even in the presence of a sufficient quantity of dyestuff to change the color of the cured resin appreciably it is important that the basic resin does not discolor during storage or use so that the shade of light transmitted by the plastic will be of the desired type, not changed by a yellow or brownish tint, even after aging at elevated temperatures.

The proportions of the various components of the molding compounds employed are such as to produce the monoester of the acid anhydride and have the glycidyl moiety of the triglycidyl isocyanurate react with the acid group resulting from the anhydride-polyol reaction. Of course, in the present reactions it is possible that a molecule of polyol may react with both carboxyls which may be considered to have come from the anhydride, or polyol hydroxyls from different polyol molecules may each react with the carboxyls. Similarly, more than one glycidyl moiety of the triglycidyl isocyanurate may react with anhydride carboxyls and in some cases such reactions may be effected before the anhydride reacts with polyol. However, in most instances the reactions may be considered to be as initially described, with a polyol forming a monoester with an acid anhydride and a glycidyl moiety of triglycidyl isocyanurate reacting with a free carboxylic acid group generated by the previous reaction. Such reactions may be considered to be effected when the three reactants are simultaneously reacted or when the triglycidyl isocyanurate is added later, after monoesterification. Proportions of reactants will usually be from 0.25 to 1 hydroxyl from the polyol and 1.00 to 1.35 glycidyl moieties from the triglycidyl isocyanurate per mole of anhydride. Preferably, these proportions are from 0.5 to 0.95 and 1.1 to 1.25, respectively. Employing such proportions and the comparatively low reaction temperatures possible with the present materials, a molding compound or intermediate is obtained which is clearer than any other epoxy resin molding compound known. Normally, the reaction temperature will be held as low as possible so as to avoid a second esterification reaction between the anhydride and the polyol. Thus, temperatures from about 70 to 140° C. will be utilized, preferably from about 70 to 100° C. for one-step reactions and 90 to 140° C. for two-step reactions. Reaction times at such temperatures are usually from 5 minutes to 5 hours, preferably from 20 minutes to 3 hours. The reaction time given is for the first portion of a two-step reaction, involving monoesterification of the acid anhydride with polyol. However, because the second step, wherein the triglycidyl isocyanurate reaction is effected, is comparatively rapid, essentially the same time, often plus two minutes to one hour, may suffice for the entire two-step or the one-step reaction, excluding B-staging.

The colorant, including fluorescent dye, lubricant and catalyst or mixtures thereof may be added at any suitable stage in the manufacturing process. The dyes, preferably dissolved in a suitable solvent, e.g., acetone, will be admixed with the polyol or with the polyol-anhydride monoester or adduct before reaction with the epoxy-containing compound. If they are heat-sensitive they may be added at a later stage and sometimes are blended with the TGIC. Stearic acid or other mold release agent or lubricant may also be added at any suitable such stage or may be blended with the final product. The catalyst, too, may be added at an intermediate stage, prior to the addition of the triglycidyl isocyanurate or with the isocyanurate.

Although it is preferred to carry out the various reactions in the liquid phase, using a heated reaction vessel, reactions of the polyol and anhydride, polyol-anhydride adduct with epoxy compound and one-step reactions can be carried out with materials initially in the solid state and with compression, shearing and other working forces causing them to be homogeneously blended and, to some extent, plasticized or liquefied. Thus, one may use a mill for such purpose, heating it or relying on frictional forces to raise the reaction temperature to the desired range. Whether mills or conventional heating and mixing means are employed, the product made is preferably deaerated before B-staging. The deaeration will usually take from 30 seconds to ½ hour and is normally effected at the lowest pressure conveniently achievable, at least below 250 mm. of mercury, preferably 5 to 150 mm. and most preferably 5 to 50 mm.

B-staging of the resin made helps to speed molding times by additionally polymerizing the resin at a comparatively low temperature, making it possible, by the present method, to produce a stable molding compound (stable for several months at room temperature) which will be satisfactorily moldable, with a short curing period. B-staging may be effected immediately after completion of the initial reaction of the three primary reactants or the initially produced resin may be held for an almost indefinite period of time, with B-staging being effected shortly before molding. In some situations molding may be carried out without B-staging. However, this last procedure involves extended molding times and diminishes operational efficiency.

B-staging will normally be effected at a temperature in the range of 50 to 100° C., preferably 60 to 80° C., for a period of 30 minutes to 24 hours, preferably from 4 to 10 hours, when no catalyst is used. With catalyst the times may be from ¼ to ⅔ of those given, so as to produce a resin sufficiently polymerized to be cured quickly in a mold, with molding times preferably being as low as possible, e.g., as low as 45 seconds being most desirable, and normally being in the range of one to five minutes, at a temperature of about 130 to 175° C., preferably from 140 to 160° C. Molding pressures (transfer molding) may be varied widely but will normally be in the range of 300 to 2,000 lbs./sq. in.

The proportions of minor components of the present resins will usually be held to less than 5% total and at such concentrations the polymerizing reaction, B-staging and curing times will not be outside the ranges previously given, nor will different temperatures or pressures be required. Generally the proportion of mold release will be from 0.0 to 2%, preferably 0.5 to 1%. With simple, well polished molds one may be able to dispense with the use of mold releases. The proportion of catalyst, if utilized, will be from 0.05 to 1%, preferably from 0.1 to 0.5%. Amounts of dyes are usually small, normally being in the range of 0.0001 to 5%, preferably being from 0.001 to 2%. The bluing agent or brightener concentrations are 0.0001 to 0.1% and the coloring dye concentration may be 0.1 to 5%, preferably 0.2 to 2%. Any solvents present with the dyes or other components may be removable in the deaeration step so that the final product to be molded is solvent-free.

After B-staging the resin may be size reduced to a suitable particle size range, e.g., 1/16 inch to ¼ inch diameter. Alternatively, it can be B-staged to pre-form shape in a suitably sized mold, and after ejection from the mold, may be employed directly.

Molding of the particulate molding compound may be by any normal method, including utilization of pre-forms and transfer molding or compression molding, wherein the polymer is thermoset to final structure. Primarily, the present molding compounds are intended for transfer molding. After curing, the finished product is ejected from the mold and such removal may often be effected immediately, without the need for any cooling. The polymer is normally employed to cover, strengthen, rigidify and/or insulate an enclosed material and such is present in the mold during the curing operation.

Although the most important application of the present methods relates to light emitting electronic devices, covered, stabilized and protected by the present cured epoxy resins in operations in which preformed or particulate molding compounds are utilized and although it is of great importance that the covering plastic be water white (except for dyes intentionally added) the polymers and molding compounds are not limited to such applications but can find more general uses as structural materials, printed circuit substrates, potting compounds, encapsulants, insulators, etc., when transparency is necessary or desirable. In one of such alternative uses the clarity of the plastic is highly advantageous, as when it encloses a photoelectric cell or other light sensitive electronic structure. In such cases, the enclosed part does not have its light-sensitivity changed by color or condition changes in the surrounding plastic, on aging. In this application and in those wherein the cured polymer is a cover for light emitting diodes or other electronic and electrical devices, the percentage of light passed through the polymer is usually greater than 90% and the percentage passed through after the extreme "torture testing" previously described is over 95% of that originally measured, often over 99% thereof.

The present products and processes are advantageous over various "similar" epoxy reins described in the prior art. Because the hexahydrophthalic anhydride reacts readily with the preferred saturated aliphatic polyols, unlike its very slow rate of reaction with more common hydroxyl-containing condensing reactants, such as Bisphenol A, comparatively low temperatures may be employed for much of the polymerizing reaction. Also, the presence of the aliphatic polyol curbs the reactivity of the anhydride so that the reaction with the epoxy compound becomes controllable and may be stopped at a convenient point, for later B-staging, as desired. While such processing advantages are of significance, even more important in most cases are the final desired properties of the polymer, already discussed at length.

Unlike the "closest" of the known prior art molding compositions and methods for their manufacture, like those of U.S. Pats. 3,624,180 and 3,642,938, wherein comparatively high temperatures are employed to produce the polyester reactants, all of which reactions involve pluralities of carboxyls of the anhydride employed, the monoesterification reactions of the present invention can take place at much lower temperatures, thereby preventing heat discoloration of the reactants and resin during esterification. The polyesters of the mentioned patents, made at the high temperatures, all are somewhat discolored. See the working examples of the patents. Although U.S. 3,624,938, in Example 8, teaches that the product is "practically colorless" when Resin B is reacted with HHPA and Polyester E, the polymer made is based on a brown polyester and accordingly, is of a diminished stability, compared to the present polymers based on clear, purer components, and is a poorer transmitter of light.

Even under circumstances wherein the prior art polyesters are said to be colorless, this is the appearance of a thin section but in a more massive molding color is apparent, especially after aging or subjection to elevated temperatures.

Another advantage is in the ability to B-stage the present resins. Thus, although cycloaliphatic resins are reputed to be color stable they are liquids and cannot be B-staged with HHPA. Any initial reaction between the anhydried, polyol and cycloaliphatic resin proceeds to completion, even at room temperature.

The following examples illustrate but do not limit the invention. Unless otherwise indicated, all temperatures are in ° C. and all parts are by weight.

Example 1

50.18 Parts of HHPA, (99.9% pure) are melted at a temperature in the range of 70 to 80° C. in a kettle equipped with an agitator, heating means and vacuum line connection. 10.00 Parts of glycerol (99.5% pure) are admixed with it, followed by 1.00 part of stearic acid, 0.5 part of a 0.05% solution of Perox Blue in acetone and 38.32 parts of triglycidyl isocyanurate (99.9% pure, approximately 20:80 mixture of high and low melting monomers). Except for the Perox Blue all reactants or components are water white.

Vacuum is applied (asbolute pressure of 25 mm. of mercury) and the temperature is maintained in the range of 75 to 80° C., with stirring, under vacuum, for an hour, after which the polymerized resin is drawn off and poured into clean aluminum dishes to produce B-staged pre-forms for transfer molding. The product is maintained at 70° C. for about six hours of B-staging, until the gel time at 160° C. is 60 to 70 seconds.

The pre-form made is then pressed to final clear protective form about a Kovar alloy integrated circuit frame carrying ten semiconductor chips, each of which has 14 leads attached to it. Molding is under a pressure of 500 lbs./sq. in. for five minutes at 163° C. The molded items are removed from the mold without cooling thereof and are found to be clear, bright and water white, about the covered, protected and rigidified light emitting electronic device.

When the unit is tested by being exposed to a temperature of 130° C. in air in an oven for 48 hours, the color and clarity are unchanged, as are the other physical properties. In some testing, at 150° C., similar results are obtained after three hours exposure. When such three hours treatment is effected as a post cure the glass transition tempreature of the product is 115° C. Even when pressure cooked in boiling water at 15 lbs./sq. in./g. for a period of 48 hours the plastic does not blush, cloud, discolor or distort.

The manufacturing method and testing reported above are with respect to a one-step preparation of a clear molding compound of this invention in which the hydroxyl content of the glycerol is present in stoichiometric ratio to react with the HHPA to esterify only one of the available carboxylic acid groups thereof, producing a free carboxylic acid and the monoester without liberation of water. The proportion of TGIC present is 1.18 times the stoichiometric proportion based on the epoxy content of the TGIC and the carboxylic acid generated from the anhydride by the monoesterification of the anhydride with the polyol. When the glycerol:HHPA equivalent is dropped to 0.9 and the TGIC:HHPA equivalent, rather than being 1.18 is raised to 1.25, a similar good product is obtained. Also, when 15% of the HHPA is replaced with tetrahydrophthalic anhydride (THPA), essentially the same type of product results, which is also the case when the glycerol is mixed with an equal proportion of trimethylol propane. These substitutions recited are with respect to hydroxyl contents of the polyols and the reactable carboxylic acid contents of the anhydride and any anhydride-polyol adducts. Similar results are obtained when the 15% replacement is by phthalic anhydride and 15% of the glycerol is replaced with others of the listed polyols, e.g., ethylene glycol, propylene glycol, diethylene glycol and dipropylene glycol.

Example 2

A one-step preparation of a molding compound is carried out essentially in accordance with the procedure of Example 1 except for the change of proportion of glycerol:HHPA from 100% of the stoichiometric proportion, on the basis previously described, to 80%. Thus, 51.46 parts of HHPA, 8.21 parts of glycerol, 1.00 part stearic acid, 0.02 part of a 0.05% solution of Perox Blue in acetone and 39.39 parts of TGIC are employed. The holding time at 75 to 80° C., with vacuum and stirring, is 45 minutes, instead of one hour and the product is drawn off through a filter and deposited in clean aluminum trays. B-staging is for seven hours at 70° C., until the gel time at 160° C. is 45 seconds and the spiral flow is 43 inches.

The molding compound is molded by the same method as reported in Example 1 and the products obtained are optically clear and water white. They are unchanged in color after 48 hours at 130° C. or after 4 hours at 150° C. In some modifications of the example mold release and dye are omitted from the formula. In such cases, the removal of the molded item from the mold is more difficult but feasible. Also, the product, although still "water white," is somewhat less bright. The polymer is still an excellent insulator and is optically clear and stable on storage in the presence of air at elevated temperatures.

The procedures of Examples 1 and 2 are repeated with the molded part being the individual device illustrated in FIGS. 1–6 and the same results are obtained. When the base material is changed to other dimensionally stable alloys than Kovar (54% iron, 28% nickel and 18% cobalt) or to such metals which do not distort badly during molding operations at elevated temperatures, e.g., stainless steels, satisfactory products result.

Example 3

In this example trimethylol propane is utilized as the polyol and the proportion thereof is 66% of the stoichiometric hydroxyl content required to esterify one of the HHPA carboxyls. Then, 111% of the stoichiometric proportion of TGIC to react with the other HHPA carboxyl or polyol-carboxyl adduct is utilized.

Utilizing the apparatus of Examples 1 and 2, 99.0 parts of TGIC are melted under a nitrogen atmosphere, after which 1.1 parts of stearic acid are added to it and the temperature of the mixture is held at 125° C. for about five minutes, until the mixture is clear, after which it is cooled to 90° C. and 27 parts of trimethylol propane (TMP) are added. The mix is then cooled to 70° C. Meanwhile, 0.005 part of Tinopal PCR (Ciba-Geigy) is mixed in with 0.5 part of melted HHPA and the mixture is subsequently mixed with 138.1 parts of additional melted HHPA. Such mixture is then admixed with the TGIC-stearic acid-TMP mix. The temperature is maintained at 85 to 90° C. for 30 minutes, after which the reaction mix is vacuum deaerated under the same conditions as are described in Example 1 and the product resin is poured into clean aluminum trays.

B-staging takes ten hours at 70° C. to produce molding compound with a gel time of 30 seconds. The product resulting, in particulate form of 6 to 100 mesh particle sizes, after grinding, is molded at 160° C. for ten minutes at 500 lbs./sq. in. pressure. The product is clear, colorless and shiny bright under fluorescent light, being slightly bluish in sunlight. It is unaffected in color or otherwise by being subjected to 48 hours in air at 130° C., three hours in air at 150° C. or 48 hours of pressure cooking at 15 lbs./sq. in. As molded, the heat distortion temperature of the polymer is 109° C. and after a post-cure of three hours at 150° C., the glass transition temperature is 144° C. If desired, pre-forms are used instead of molding powders.

In this and the other examples of this application the TGIC may be melted under nitrogen or may be reacted with the other constituents of the molding compound in air. In all such cases, when nitrogen is utilized there is less possibility of the TGIC being prematurely polymerized but both air and nitrogen blanket reactions are operative to produce the desired products.

When 0.12 part of stannic stearate or stannic laurate catalyst is admixed with the TGIC-stearic acid-TMP blend the reaction time is diminished from 30 minutes at 85° C. to 90° C. to 15 minutes at such temperature and the B-staging time at 70° C. is lowered to five hours to produce a gel time of 30 seconds.

In modifications of the molding procedures, molding pressures of 300, 500, 1,000 and 2,000 lbs./sq. in. are employed, with molding times being from about 5 to about 3 minutes, at 163° C. The products made are essentially equivalent to that previously described. Also, when utilizing such pressures and times, the molding temperature is varied from 130 to 175° C., e.g., 130, 150, 165, and 175° C., and excellent molded articles are obtained.

Example 4

The procedure of Example 3 is repeated with the exception that 12.4 parts of glycerol are utilized in place of the trimethylol propane. Molded parts made are of excellent clarity and are color stable. The glass transition temperature thereof is about 137° C.

Example 5

A one-step method for preparing a clear red molding compound includes use of 50% of the stoichiometric quantity of glycerol with respect to HHPA and 1.18 times the stoichiometric quantity of TGIC, also with respect to the HHPA.

504 Parts of HHPA are melted and weighed into a heating vessel, being at about 80° C., after which the other components of the molding compound, including 50.0 parts of glycerol, 10.0 parts of stearic acid, 1.3 parts of Oil Red dye (DuPont) and 384.0 parts of TGIC, all lower melting (103° C.) isomer. The mix is held at 80° C. for 90 minutes, while being stirred, is then deaerated at 100 mm. of mercury, absolute pressure and is poured into trays for B-staging. The gel time of the product at this point is 4.5 minutes at 160° C. After B-staging for seven hours at 70° C. the gel time is 36 seconds and the spiral flow is 30 inches. The product made is ground to the 6 to 100 mesh range and is molded five minutes at 163° C. under a pressure of 500 lbs./sq. in. The molded article is attractive looking, of a bright clear red. One can easily read elite type letters through a ½ inch thickness of the cured clear red material. The polymer is not clouded or otherwise affected after 48 hours of pressure cooking at 15 lbs./sq. in.

The previous examples all relate to one-step methods for the manufacture of clear molding compounds and such one-step methods are usually highly preferred. However, sometimes, to obtain a more reproducible composition, two-step reactions are effected, in most of which the first reaction will be that of the polyol with the anhydride, after which the TGIC is reacted with the adduct produced. The following examples are of such two-step methods, through Example 7.

Example 6

924 Parts (six molar proportions) of HHPA and 268 parts (two molar proportions and 6 equivalents) of TMP are heated together in a resin kettle equipped with a stirrer, pot thermometer, nitrogen blanket and vacuum attachments. Heating continues until exotherm, which occurs at about 105° C. Heat is removed by use of a cold water bath or circulating coolant and the exotherm is held to a maximum of about 140° C. for best operation. After it has subsided, a vacuum is applied to an absolute pressure of about 20.0 mm. of mercury to deaerate the mix. It is then dumped onto a clean aluminum surface. The entire reaction time taken is about 2.5 hours and the product is crystal clear, water white and grindable.

178 Parts (0.9 equivalents) of the hardener adduct and 99 parts (one equivalent of TGIC resin, the latter containing 2.5 parts of stearic acid, are separately heated mixed together and reacted at 125° C. for five minutes, after which they are deaerated at an absolute pressure of 10.0 mm. of mercury. The product is poured into a foil tray and is cooled to a hard brittle solid at room temperature. It is ground to a particle size range of 6 to 140 mesh and is found to have a gel time of 3.7 minutes.

The molding compound intermediate is then B-staged at 70° C. for 10.3 hours, resulting in a gel time of 44 seconds. When molded at 170° C. for 4.5 minutes at a pressure of 500 lbs./sq. in. the molded item produced is of good color and clarity, being water white. No change in color or clarity occurs after 48 hours at 130° C. or 48 hours pressure cooking at 15 lbs./sq. in. The product is useful to encapsulate electronic light emitting or receiving parts such as are employed in computer read-out elements, and is utilized for such purpose. Such parts are also of good stability, strength and heat resistance.

When the experiment is repeated with an equivalent (on a hydroxyl basis) proportion of glycerol utilized in place of TMP, essentially the same results are obtained and the products are like those previously described which have been manufactured by the one-step process.

Example 7

1155 Parts (7.5 molar proportions) of HHPA and 268 parts (2 molar proportions or 6 equivalents) of TMP are heated together in a resin kettle equipped with thermometer, vacuum attachment, stirrer and nitrogen blanket. After about an hour the temperature has been raised to 115° C., at which an exotherm occurs. Heat is removed by the circulation of a coolant about the reaction mixture but the temperature climbs to 140° C. in two minutes. However, with the aid of a cold water bath and circulating coolant the temperature rise halts and then subsides, after which the molding compound intermediate is poured onto clean trays and is allowed to cool. The entire reaction time, from melting to pouring, takes about two hours. The product is water white and crystal clear but is slightly tacky.

In a second step, 99.0 parts (1 equivalent) of TGIC plus two parts of stearic acid are melted under nitrogen. 123.2 parts (0.8 equivalent) of the hardener adduct previously described are heated separately and mixed with the TGIC-stearic acid mix at 120° C. for five minutes, after which the intermediate resin resulting is deaerated at 20.0 mm. of mercury, absolute pressure. The deaeration takes five minutes. The product is viscous and after deaeration is poured into clean aluminum lined trays where it hardens to a brittle solid at room temperature. The gel time of the molding compound intermediate is two minutes.

After B-staging for six hours at 70° C. the gel time becomes 50 seconds. The ground molding compound, at a particle size in the range of 6 to 100 mesh, is molded at 500 lbs./sq. in. for ten minutes, producing a molded light emitting electronic device encased in the epoxy polymer. The product releases well from the mold and has an excellent hot strength. The color and clarity thereof are good, with the molded epoxy polymer being clear and water white. No changes in color or clarity or other characteristics of the molded article are evident after oven storage at 130° C. for 48 hours.

When the particulate molding compound is replaced by a pre-form and light-responsive parts, such as photoelectric cell elements, are encapsulated in the epoxy resin, the molding is easily effected and the polymer made has excellent clarity and light transmitting properties.

Example 8

The procedure of Example 2 is repeated but with the glycerol being replaced by TMP and with the B-staged resin being sized reduced to particles in the 1/16 to 1/4 inch diameter range before molding. The product made is equally clear and satisfactory. Such is also the case when the molding pressures are changed to 300 lbs./sq. in. and 800 lbs./sq. in. with molding times being increased 50% and decreased 50%, respectively, and with powders or preforms being employed. Similar good results are obtained when light emitting diodes are encapsulated or covered with the described resins by the same processes.

The invention has been described with respect to illustrations and embodiments thereof but is not to be considered as limited to these because it is evident that one of skill in the art, with the present specification before him, will be able to utilize substitutes and equivalents without departing from the spirit or scope of the invention.

We claim:

1. A clear molding compound which is a reaction product of a polyol selected from the group consisting of glycerol, trimethylol propane, mixtures thereof, and any of the foregoing including up to 25% of the total polyol content of a polyol selected from the group consisting of ethylene glycol, diethylene glycol, propylene glycol, dipropylene glycol, pentaerythritol and propoxylated pentaerythriol, hexahydrophthalic anhydride, up to 25% of which is replaceable with an acid anhydride selected from the group consisting of tetrahydrophthalic anhydride, phthalic anhydride and mixtures thereof, and triglycidyl isocyanurate, the proportions of said polyol, anhydride and isocyanurate being such that there are initially present from 0.25 to 1 hydroxyl from the polyol and 1 to 1.35 glycidyl moieties from the isocyanurate per mol of anhydride and the reaction temperature being in the range of about 70° to about 140° C.

2. A molding compound according to claim 1 wherein the polyol is selected from the group consisting of glycerol, trimethylol propane and mixtures thereof and the anhydride is hexahydrophthalic anhydride.

3. A molding compound according to claim 2 wherein the reactant proportion ranges are 0.5 to 0.95 and 1.1 to 1.25, respectively.

4. A molding compound according to claim 3 wherein the described product is B-staged to such an extent that the product is stable and can be cured quickly, in from 45 seconds to five minutes at a temperature from 130 to 175° C.

5. A molding compound according to claim 4 wherein the B-staging is effected by heating to a temperature in the range of 50 to 100° C. for a period of from 30 minutes to 24 hours.

6. A molding compound according to claim 5 wherein the polyol is glycerol and the reactions of the glycerol, hexahydrophthalic anhydride and triglycidyl isocyanurate are effected simultaneously.

7. A molding compound according to claim 5 wherein the polyol is trimethylol propane and the reactions of the trimethylol propane, hexahydrophthalic anhydride and triglycidyl isocyanurate are effected simultaneously.

8. A molding compound according to claim 1 wherein the polyol is selected from the group consisting of glycerol, trimethylol propane and mixtures thereof and the reactions are effected simultaneously.

9. A molding compound according to claim 5 wherein the polyol is glycerol, up to 25% of the glycerol is replaced with an equivalent proportion, on a hydroxyl basis, of a polyol selected from the group consisting of ethylene glycol, diethylene glycol, propylene glycol, dipropylene gylcol and pentaerythritol, up to 25% of the hexahydrophthalic anhydride is replaced with an aromatic acid anhydride selected from the group consisting of tetrahydrophthalic anhydride and phthalic anhydride, and the reactions are effected simultaneously.

10. A molding compound according to claim 1 wherein the polyol is glycerol and the anhydride is hexahydrophthalic anhydride.

11. A molding compound according to claim 1 wherein the polyol is trimethylol propane and the anhydride is hexahydrophthalic anhydride.

12. A molding compound according to claim 10 wherein the reactant proportion ranges are 0.5 to 0.95 and 1.1 to 1.25, respectively.

13. A molding compound according to claim 11 wherein the reactant proportions are 0.5 to 0.95 and 1.1 to 1.25, respectively.

14. A method of making a clear molding compound which comprises reacting a polyol selected from the group consisting of glycerol, trimethylol propane, mixtures thereof, and any of the foregoing including up to 25% of the total polyol content of a polyol selected from the group consisting of ethylene glycol, diethylene glycol, propylene glycol, dipropylene glycol, pentaerythritol and propoxylated pentaerythritol, hexahydrophthalic anhydride, up to 25% of which is replaceable with an acid anhydride selected from the group consisting of tetrahydrophthalic anhydride, phthalic anhydride and mixtures thereof, and triglycidyl isocyanurate, the proportions of polyol, anhydride and isocyanurate being such that there are initially present from 0.25 to 1 hydroxyl from the polyol and 1 to 1.35 glycidyl moieties from the isocyanurate per mol of anhydride, at a reaction temperature in the range of about 70° to about 140° C., under which conditions the acid anhydride reacts with the polyol to produce an ester with a free carboxylic acid group and the carboxylic acid group reacts with a glycidyl moiety of the trigylcidyl isocyanurate.

15. A method according to claim 14 wherein the polyol is selected from the group consisting of glycerol, trimethylol propane and mixtures thereof, and the anhydride is hexahydrophthalic anhydride.

16. A method according to claim 15 wherein the reaction proportion ranges are from 0.5 to 0.95 and 1.1 to 1.25, respectively.

17. A method according to claim 16 wherein the described product B-staged to such an extent that the product is stable and can be cured quickly, in from 45 seconds to five minutes at a temperature from 130 to 175° C.

18. A method according to claim 17 wherein the B-staging is effected by heating to a temperature in the range of 50 to 100° C. for from 30 minutes to 24 hours.

19. A method according to claim 18 wherein the polyol is glycerol and the reactions of the glycerol, hexahydrophthalic anhydride and triglycidyl isocyanurate are effected simultaneously.

20. A method according to claim 18 wherein the polyol is trimethylol propane and the reactions of the trimethylol propane, hexahydrophthalic anhydride and triglycidyl isocyanurate are effected simultaneously.

21. A method according to claim 18 wherein the polyol is glycerol, up to 25% of the glycerol is replaced with an equivalent proportion, on a hydroxyl basis, of a polyol selected from the group consisting of ethylene glycol, diethylene glycol, propylene glycol, pentaerythritol and propoxylated pentaerythritol, and the reactions are effected simultaneously.

22. A method according to claim 14 wherein the reactions to produce the clear molding compound are effected simultaneously.

23. A method according to claim 14 wherein the lower aliphatic polyol is reacted with hexahydrophthalic anhydride initially and the product of that reaction is then reacted with triglycidyl isocyanurate.

24. A method according to claim 23 wherein the polyol is trimethylol propane.

25. A method according to claim 23 wherein the polyol is glycerol.

26. A method according to claim 18 wherein the reaction of polyol or mixture thereof with hexahydrophthalic anhydride is effected initially and the product of that reaction is subsequently reacted with triglycidyl isocyanurate.

27. A method according to claim 14 wherein the polyol is glycerol and the anhydride is hexahydrophthalic anhydride.

28. A method according to claim 14 wherein the polyol is trimethylol propane and the anhydride is hexahydrophthalic anhydride.

29. A method according to claim 27 wherein the reaction proportion ranges are from 0.5 to 0.95 and 1.1 to 1.25, respectively.

30. A method according to claim 28 wherein the reaction proportion ranges are from 0.5 to 0.95 and 1.1 to 1.25, respectively.

31. A method according to claim 27 wherein the reactions to produce the clear molding compound are effected simultaneously.

32. A method according to claim 28 wherein the reactions to produce the clear molding compound are effected simultaneously.

33. A method according to claim 29 wherein the glycerol is reacted with hexahydrophthalic anhydride initially and the product of the reaction is then reacted with triglycidyl isocyanurate.

34. A method according to claim 30 wherein the trimethylol propane is reacted with hexahydrophthalic anhydride initially and the product of that reaction is then reacted with triglycidyl isocyanurate.

35. A method according to claim 29 wherein the described product is B-staged to such an extent that the product is stable and can be cured quickly, in from 45 seconds to five minutes, at a temperature in the range of 130° to 175° C.

References Cited
UNITED STATES PATENTS

| | | |
|---|---|---|
| 3,089,863 | 5/1963 | Hicks et al. |
| 3,624,180 | 11/1971 | Schmid et al. |
| 3,642,938 | 2/1972 | Schmid et al. |

MELVIN GOLDSTEIN, Primary Examiner

U.S Cl. X.R.

260—75 EP, 835; 264—272